(12) United States Patent
Kawolics

(10) Patent No.: US 6,868,994 B2
(45) Date of Patent: Mar. 22, 2005

(54) LIQUID-DISPENSING FAUCET INCLUDING MOUNTING FITTING WITH VALVE SEAT

(75) Inventor: Raymond P. Kawolics, Solon, OH (US)

(73) Assignee: The Meyer Company, Cleveland, OH (US)

(*) Notice: Subject to any disclaimer, the term of this patent is extended or adjusted under 35 U.S.C. 154(b) by 0 days.

(21) Appl. No.: 10/375,619

(22) Filed: Feb. 27, 2003

(65) Prior Publication Data

US 2003/0226994 A1 Dec. 11, 2003

Related U.S. Application Data

(60) Provisional application No. 60/361,141, filed on Mar. 1, 2002.

(51) Int. Cl.[7] .............................................. F16K 51/00
(52) U.S. Cl. ..................... 222/517; 222/105; 222/559; 251/242; 251/263; 251/331
(58) Field of Search ............................... 222/517, 559, 222/105; 251/331, 335.2, 242, 263

(56) References Cited

U.S. PATENT DOCUMENTS

| | | | |
|---|---|---|---|
| 15,719 A | * | 9/1856 | Goodridge .................. 251/337 |
| 957,347 A | | 5/1910 | Kennedy |
| 2,097,063 A | * | 10/1937 | Heller ......................... 251/263 |
| 2,840,339 A | | 6/1958 | Price |
| 3,081,063 A | | 3/1963 | Seltsam |
| 3,085,720 A | * | 4/1963 | Boch et al. ................. 222/517 |
| 3,094,145 A | | 6/1963 | Chernak et al. |
| 3,104,089 A | | 9/1963 | Seltsam |
| 3,107,894 A | | 10/1963 | Quinn |
| 3,207,472 A | | 9/1965 | Seltsam |
| 3,246,872 A | | 4/1966 | Seltsam |
| 3,301,525 A | | 1/1967 | Chernak et al. |
| 3,417,962 A | | 12/1968 | Fuerst |
| 3,885,713 A | * | 5/1975 | Weitzel et al. .............. 222/474 |
| 3,904,174 A | | 9/1975 | Giese |
| 4,044,998 A | | 8/1977 | Giese |
| 4,166,606 A | | 9/1979 | Kawolics et al. |
| 4,375,864 A | * | 3/1983 | Savage ....................... 222/559 |
| 4,493,443 A | * | 1/1985 | Bailey ........................ 222/529 |
| 5,449,144 A | | 9/1995 | Kowalics |

* cited by examiner

Primary Examiner—John Bastianelli
(74) Attorney, Agent, or Firm—Fay, Sharpe, Fagan, Minnich & McKee, LLP

(57) ABSTRACT

A liquid-dispensing faucet includes a mounting fitting that defines a first flow passage and that is adapted for connection to an associated container with the first flow passage in communication with an internal space of the container. The mounting fitting comprises a valve seat. A body is connected to the mounting fitting. The body defines an inlet, an outlet and a second flow passage that fluidically interconnects the inlet and the outlet. A seal member is connected to the body and is selectively movable between a first operative position and second operative position. The seal member sealingly mates with the valve seat to block the first flow passage when the seal member is in the first operative position. An actuator is operably coupled to the seal member for moving the seal member from the first operative position to the second operative position. In this manner, the valve seat is provided in the mounting fitting rather than as a part of the faucet body.

3 Claims, 2 Drawing Sheets

LIQUID-DISPENSING FAUCET INCLUDING MOUNTING FITTING WITH VALVE SEAT

CROSS-REFERENCE TO RELATED APPLICATION

This application claims benefit of the filing date of and priority from U.S. provisional application Ser. No. 60/361,141 filed Mar. 1, 2002.

BACKGROUND OF THE INVENTION

Liquid dispensing faucets for coolers and other applications are well-known. These faucets are supplied in a wide variety of configurations, including those with a body defining a flow passage through which the liquid being dispensed must pass to exit the faucet. A valve seat is defined by the body and a sealing member selectively mates with the seat to block fluid flow into and/or through the flow passage. The sealing member is selectively movable away from the valve seat to allow liquid flow. The sealing member is typically biased into sealing contact with the valve seat by its own resiliency and/or by biasing means such as a spring.

These prior faucets are typically connected to the cooler, urn or other liquid container by mating with a separate fitting of the container or by use of a nut or like fastening means. These prior arrangements for operably connecting the faucet to the liquid-containing vessel are highly effective but, in some cases, these prior arrangements have been found to add undesired expense to the faucet and/or the container to which the faucet is connected. Also, certain applications require a more compact arrangement where the faucet has a short stand-off distance relative to the body of the cooler or other container. For other reasons, it is sometimes undesirable to use conventional faucets wherein the body, itself, includes a valve seat defined therein and wherein a separate bonnet or other member including a seal must be connected to the body.

SUMMARY OF THE INVENTION

In accordance with a first aspect of the present invention, a liquid-dispensing faucet includes a mounting fitting defining a first flow passage. The fitting is adapted for connection to an associated container with the first flow passage in communication with an internal space of the container. The fitting further comprises a valve seat. A body defines an inlet, an outlet and a second flow passage that fluidically interconnects the inlet and outlet. The body is connected to the fitting and further comprises a seal member that is selectively movable between a first operative position and second operative position. The seal member sealingly mates with the valve seat to block the first flow passage when the seal member is in the first operative position. An actuator is operably coupled to the seal member for moving the seal member from the first operative position to the second operative position.

In accordance with another aspect of the invention, a faucet comprises a mounting fitting connected to a liquid container. The fitting comprises: (i) a first flow passage defined therein that communicates with an internal liquid-holding space of the container; and, (ii) a valve seat in communication with the first flow passage. The valve seat is located external to the container. A body is operably connected to the fitting. The body comprises a liquid inlet for flow of liquid into the body, a liquid outlet for flow of liquid out of the body, and a second flow passage that fluidically interconnects the inlet and outlet. A seal is located within the body and is movable between a first position in sealing engagement with the valve seat and a second position unseated from the valve seat. An actuator is operably coupled to the seal and is manually operable to move the seal selectively from the first position to the second position.

In accordance with another aspect of the invention, a faucet includes a first member comprising a valve seat. The first member defines a first passage adapted for communication with a liquid holding space of a container and also defines a valve seat. A second member is coupled to the first member and defines a second flow passage that communicates with the first flow passage through the valve seat and that comprises an outlet in communication with the second flow passage and from which liquid is dispensed. A seal is operably connected to the second member. A manual actuator is operably coupled to the seal to move the seal from a first operative position to a second operative position. The seal engages the valve seat with a fluid-tight fit when in the first operative position.

BRIEF DESCRIPTION OF THE DRAWINGS

The present invention comprises various components and arrangements of components, a preferred embodiment of which is illustrated in the accompanying drawings that form a part hereof and wherein.

DETAILED DESCRIPTION OF THE INVENTION

Figure 1:
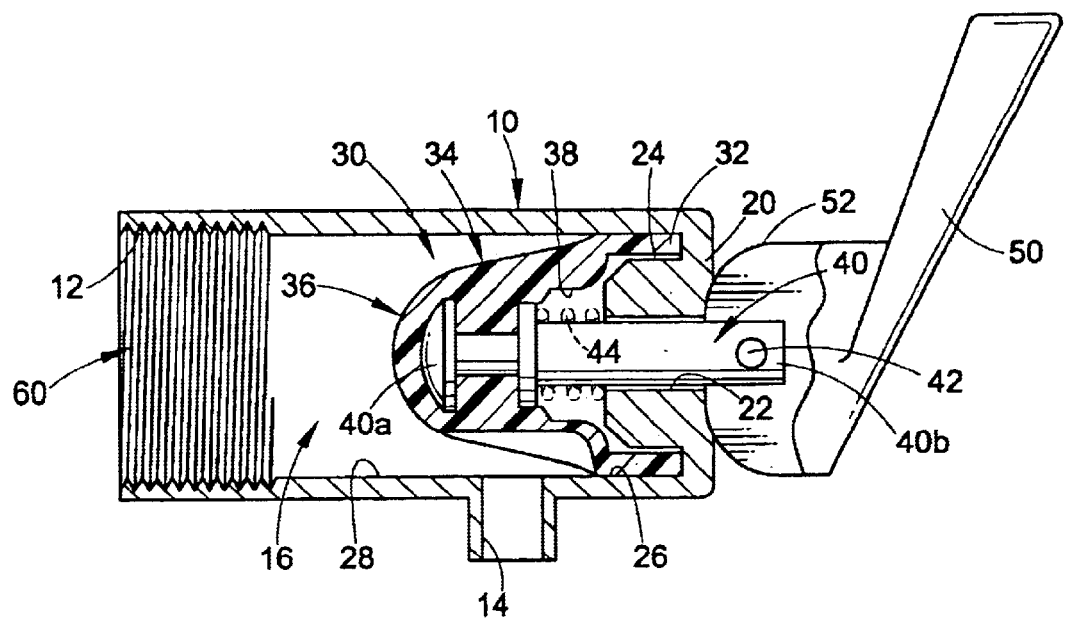
FIG. 1 is a sectional view of a faucet body portion formed in accordance with the present invention, with a seat cup seal member thereof positioned in a first operative position (an optional biasing spring is shown in broken lines)
Figure 2:
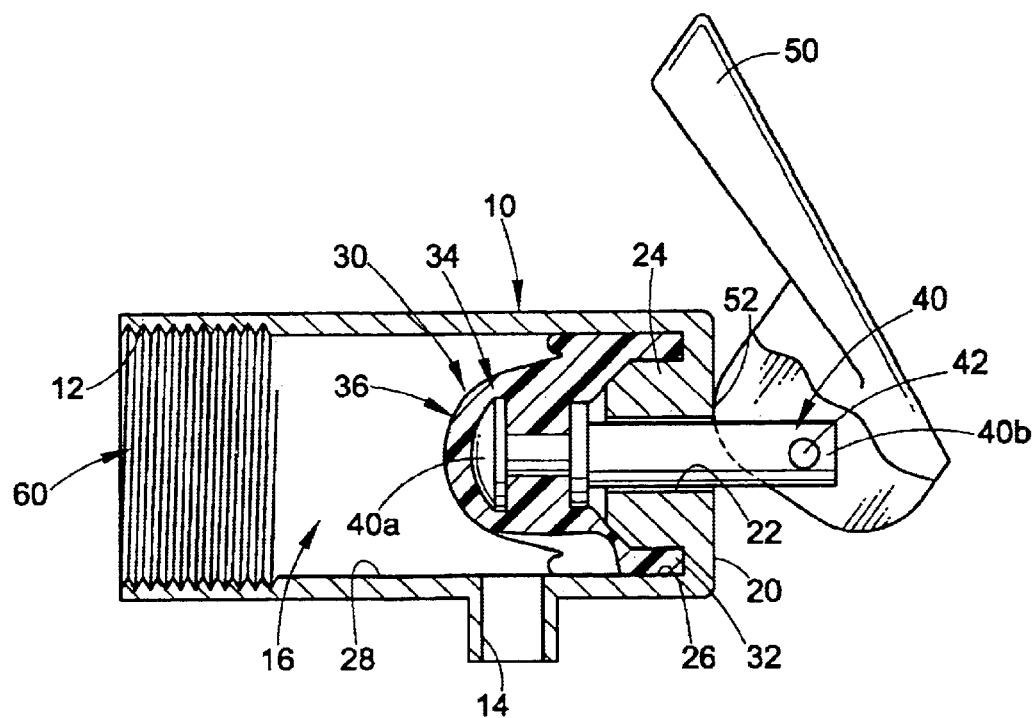
FIG. 2 is a section view that is similar to FIG. 1 but illustrates the seat cup seal member in a second operative position.

Referring now to FIGS. 1 and 2, a faucet body 10 is defined from molded plastic, metal, or any other suitable material as a one-piece construction or as an assembly. As shown, body 10 is defined as a one-piece molded plastic construction. The body 10 defines a liquid inlet 12, a liquid outlet 14 and a bore or flow passage 16 that fluidically interconnects the inlet 12 and outlet 14. The outlet 14 is open to the environment external to said body for dispensing liquid for human consumption or other use.

Axially spaced from the inlet 12, the body 10 defines an end-wall 20 that closes the flow passage 16 opposite the inlet 12. Preferably, the end wall 20 is defined as a one-piece construction as a part of the body 10 but can be provided as a separate member that is threaded or otherwise secured to the body 10. An aperture 22 is defined in the end-wall 20, and is preferably coaxial with flow passage 16. The end-wall 20 comprises a boss 24 that projects outwardly therefrom into the flow passage 16. An annular groove 26 is defined between the boss 24 and an inner wall 28 of the body 10 and is preferably concentric with aperture 22.

With continuing reference to FIGS. 1 and 2, a seat cup seal member 30 is operably positioned in the flow passage 16 as shown. The seat cup seal member 30 has an overall nipple-like configuration and is preferably defined as a one-piece construction from a molded elastomeric or other resilient material such as silicone or the like. In particular, the seat cup seal member 30 defines a peripheral annular rim 32 at its base that is closely received by and seated in the annular groove 26. The rim 32 is engaged with the portions of the body that define the groove 26 with a fluid-tight fit to prevent fluid flow between the rim 32 of the seat cup seal 30 and the body 10. This fluid-tight fit prevents undesired fluid flow from the inlet 12 to the aperture 22. The seat cup seal member 30 includes or defines a nose portion 34 that projects from the peripheral rim or base portion 32 axially into the flow passage 16. The nose portion 34 defines a sealing face 36, and an internal recess 38 is defined between the nose portion 34 and the peripheral base rim 32. Thus, those of ordinary skill in the art will recognize that the seat cup seal member 30 sealingly covers the aperture 22, with the internal recess 38 oriented toward the wall 20 so that the boss 24 extends into the recess 38.

A stem 40 is operably connected to the nose portion 34 of the seat cup seal member 30. The stem 40 projects away from the sealing face 36 of the seat cup seal 30 through the recess 38 and extends entirely through the aperture 22 defined in the end-wall 20. The stem 40 is defined from plastic, metal or any other suitable material. The stem 40 has a first or proximal end 40a that is fixedly engaged with nose 36 of the seat cup seal 30 so that movement of the stem 40 results in corresponding movement of the nose 36. In the illustrated embodiment, the first end 40a of the stem 40 is fixedly secured to the nose 36 by mechanical engagement of these two member having mating shapes, although an adhesive, insert-molding or other connection means can alternatively be used in accordance with the present invention. Opposite the first end 40a, the stem 40 includes a second or distal end 40b adapted for connection to an actuator 50, such as a lever, button, etc. In the illustrated embodiment, the actuator 50 comprises a lever that is pivotably connected to distal end 40b of stem 40 via pivot pin 42 that allows the lever to pivot relative to stem 40 about pin 42. In an alternative embodiment, the lever or other actuator 50 is pivotably snap-fit to the distal end 40b of the stem 40.

Again, as is generally known, the seat cup seal member 30, the stem 40 and the actuator 50 are conformed, dimensioned and arranged relative to each other such that manual movement of the actuator 50 from the normal, relaxed position shown in FIG. 1 to the position shown in FIG. 2 causes a cam portion 52 of the actuator 50 to bear against an outer portion of the end-wall 20 which, in turn, results in the stem 40 being pulled axially out of the aperture 22. The nose portion 34 of the seat cup seal member 30, including the sealing face 36 is moved axially with the stem 40 away from inlet 12 of body 10 to a second operative position as shown in FIG. 2. Upon release of the manual pressure exerted on the actuator, the natural resiliency of the seat cup seal member 30 and/or the action of an optional biasing spring (shown at 44 in broken lines) operably positioned between boss 24 and stem 40 causes the seat cup seal member 30 to return to its normal, extended position as shown in FIG. 1. It should be noted that the seat cup seal member 30 can be provided with or without a biasing spring 44 and can be provided in any suitable form. It is not intended that the present invention be limited to the illustrated seat cup seal member or any other particular type of seal member. In an alternative embodiment, the seal member 30 must be manually moved to and between both of the first and second operative positions, i.e., movement of the actuator 50 is required in all cases to move the seal member 30 from the first or second position to the other position.

Figure 3:
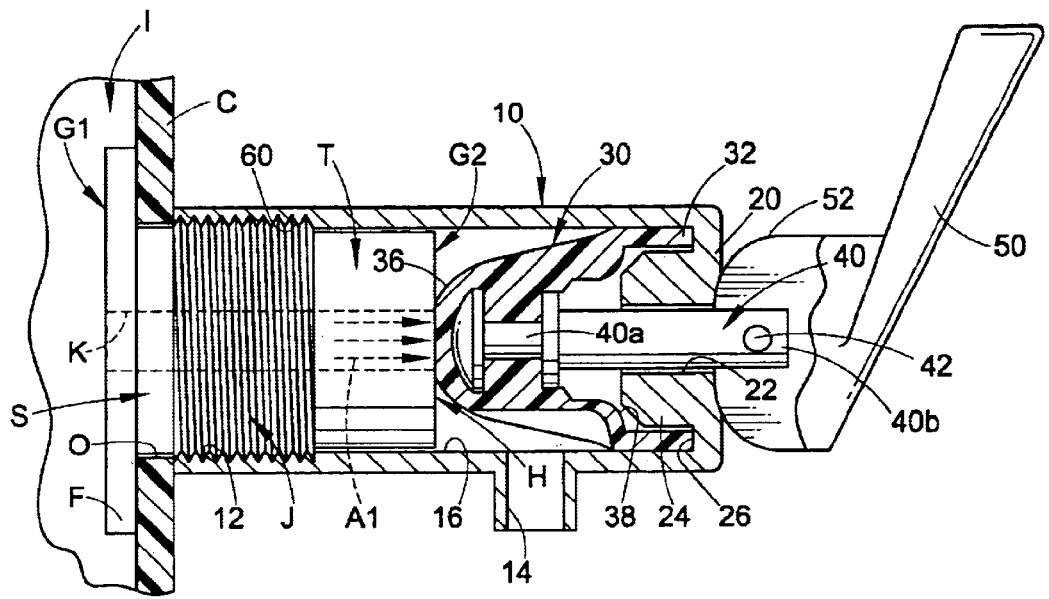
FIG. 3 illustrates the faucet body of FIG. 1 (without the optional spring) connected to a mounting fitting that includes an integral valve seat, again with the seat cup seal member positioned in its first operative position.
Figure 4:
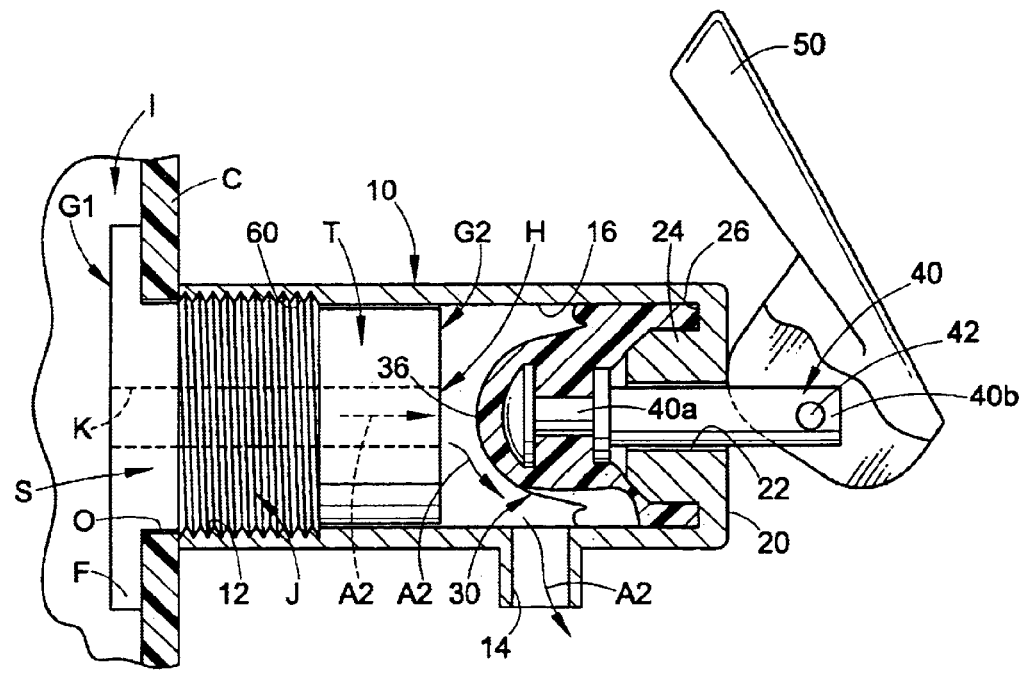
FIG. 4 is similar to FIG. 3 but shows the seat cup seal member in the second operative position.

With reference now also to FIGS. 3 and 4, a wall C of a fluid container such as a cooler, water tank or the like includes or defines a mounting fitting S that projects therefrom. In the illustrated embodiment, the fitting S comprises a male portion T that projects outwardly away from the container wall C (exteriorly of the container) through an opening O defined in the wall C, and a flange portion F that abuts an inner surface of the wall C to hold the fitting S in place, i.e., the flange F prevents the fitting S from being able to fit through the opening O. The fitting S can be secured in this position by any suitable means such as a nut, adhesive, friction fit and/or any other suitable arrangement. The fitting S can also be secured in its operative position by connection of the body 10 thereto as described below. Furthermore, the fitting S can be molded as a part of or otherwise be integral to the wall C of the container. As illustrated herein, the fitting S is defined as a one-piece construction defined from molded plastic, metal or the like. The fitting S can alternatively be assembled from more than one-piece without departing from the overall scope and intent of the present invention.

A faucet according to the present invention is provided by operative connection of the body 10 to the mounting fitting S as illustrated in FIGS. 3 and 4. The body 10 is operably connected to the mounting fitting S by any suitable means such as a threaded connection as shown or by a bayonet-type connection, adhesive, welding, simple friction-fit, snap-fit, supplemental fasteners and/or an other fastening means. In the illustrated embodiment, the male portion T includes external threads J, and the faucet body 10 defines mating internal threads 60 adjacent the inlet 12. Furthermore, the male portion T of the fitting S is conformed and dimensioned for receipt in the inlet 12 and bore 16 as shown in FIGS. 3 and 4. In particular, the external threads J and the internal threads 60 coact to releasably mate the body 10 and the male portion T of the fitting S in a fluid-tight manner. When the body 10 is threadably connection to the fitting S, these components are arranged during the threaded engagement so that the outlet 14 of body 10 is positioned as desired (typically oriented downward for gravity flow of liquid therefrom) when the threaded engagement is complete.

The fitting S defines a liquid flow passage K that extends axially therethrough from a first face G1 located inside the container defined by the wall C to a second face G2, i.e., the liquid flow passage K is in fluid communication with the internal liquid-holding space I of the container as defined by wall C. The second face G2 includes or defines a valve seat H surrounding the liquid flow passage K and in communication with said passage K. The valve seat H is preferably defined directly in the second face G2 but can also be provided by a separate member (e.g., a washer or o-ring seal or the like) connected to the fitting S. The sealing face 36 of the seat cup seal member 30 is adapted to mate in a fluid-tight manner with the valve seat K when the seat cup seal member 30 is in its first operative position as shown in FIGS. 1 and 3 to block the passage K and prevent fluid flow from the container space I out of the passage K as indicated by the arrows A1 (FIG. 3). On the other hand, exertion of manual pressure on the actuator 50 as described above moves the seat cup seal member 30 to its second operative position as shown in FIGS. 2 and 4 so that the sealing face 36 thereof is disengaged from the seat H, thereby allowing fluid flow from the container internal space I into and through the passage K and eventually to the outlet 14 of body 10 via passage 16 as indicated by the arrows A2. Again, as noted above, release of the manual pressure exerted on the actuator 50 results in the seat cup seal member 30 automatically returning to its first operative position (FIGS. 1 and 3) so that the sealing face 36 once again engages the valve seat H with a fluid-tight seal. For ease of reference in the claims, the flow passage K is referred to as the first flow passage while the flow passage 16 is referred to as the second flow passage. The optional spring 44 is shown only in FIG. 1 to simplify the drawings.

As noted, the male portion T of the fitting S can be mated to the body 10 as described above using any suitable connection means, and the invention is not to be limited to the threaded arrangement illustrated herein. In particular, the body 10 can engage the male portion T with a friction fit, a snap fit, a bayonet-type mount, an adhesive connection, a heat or solvent weld or any other arrangement. Furthermore, it should be recognized that, whatever type of connection means is employed, the resulting connection of the body 10 to the male portion T should be a fluid-tight arrangement and should result in the outlet 14 being oriented in the desired direction (typically downwardly). Also, the connection of the body 10 to the male portion T of the fitting should be accomplished in a manner that results in the valve seat H being located at the desired axial location in the bore 16 so that the sealing face 36 of the seat cup seal member 30 mates with the valve seat H in a fluid-tight manner when the seat cup seal member 30 is located in its first operative position. This result can be accomplished using a positive-stop feature that ensures the body 10 is connected to the male portion T at the intended operative position.

The invention has been described with reference to preferred embodiments. Modifications and alterations will occur to those of ordinary skill in the art to which the invention pertains upon reading this specification. It is intended that the invention be construed as including all such modifications and alterations.

I claim:

1. A faucet comprising:
  a mounting fitting connected to a liquid container and projecting outwardly from a wall of the container that defines an internal liquid holding space, said mounting fitting comprising; (i) a first flow passage defined therein that communicates with said internal liquid-holding space; and, (ii) a valve seat in communication with said first flow passage, said valve seat located external to said container;
  a body releasably connected to said mounting fitting, said body comprising a liquid inlet for flow of liquid into said body, a liquid outlet for flow of liquid out of said body, and a second flow passage that fluidically interconnects said inlet and said outlet;
  a resilient elastomeric cup-shaped seal located within said body, said seal movable between a first position in sealing engagement with said valve seat and a second position where said seal is resiliently deformed and is unseated from said valve seat, wherein said seal defines a recess and said body comprises a boss that is received in said recess of said seal so that a peripheral base of said seal surrounds said boss and engages said body with a fluid-tight fit;
  a stem operably connected to said seal, said stem extending through an opening defined in an end-wall of said body, wherein said opening extends through said boss; and,
  an actuator connected to said stem and operably coupled to said seal by means of said stem, wherein said stem extends through said recess of said seal, said actuator manually operable to move said seal selectively from said first position to said second position by pulling said stem outwardly through said opening of said body in a direction away from said valve seat.

2. The faucet as set forth in claim 1, wherein said seal member comprises a seat cup including a nose portion that projects outwardly from said peripheral base, said nose portion defining a sealing face that mates with and sealingly engages said valve seat when said seal is located in said first position.

3. The faucet as set forth in claim 1, wherein said mounting fitting is releasably secured to said wall and comprises a flange located within said liquid holding space in abutment with a wall of said container, wherein said wall of said container is captured between said body and said flange.

* * * * *